United States Patent
Delbruck et al.

(10) Patent No.: US 10,262,207 B2
(45) Date of Patent: Apr. 16, 2019

(54) METHOD FOR TRACKING KEYPOINTS IN A SCENE

(71) Applicant: UNIVERSITAT ZURICH, Zurich (CH)

(72) Inventors: Tobias Delbruck, Zurich (CH); Christian Brandli, Baden (CH); Marc Osswald, Zurich (CH)

(73) Assignee: UNIVERSITAT ZURICH, Zurich (CH)

( * ) Notice: Subject to any disclaimer, the term of this patent is extended or adjusted under 35 U.S.C. 154(b) by 0 days.

(21) Appl. No.: 15/328,084

(22) PCT Filed: Jul. 24, 2015

(86) PCT No.: PCT/EP2015/067091
§ 371 (c)(1),
(2) Date: Jan. 23, 2017

(87) PCT Pub. No.: WO2016/012624
PCT Pub. Date: Jan. 28, 2016

(65) Prior Publication Data
US 2017/0206422 A1   Jul. 20, 2017

(30) Foreign Application Priority Data

Jul. 24, 2014   (EP) .................................. 14178447

(51) Int. Cl.
*G06K 9/00*   (2006.01)
*G06K 9/46*   (2006.01)
(Continued)

(52) U.S. Cl.
CPC ........ *G06K 9/00711* (2013.01); *G06K 9/4671* (2013.01); *G06K 9/605* (2013.01);
(Continued)

(58) Field of Classification Search
None
See application file for complete search history.

(56) References Cited

U.S. PATENT DOCUMENTS 6,711,293 B1   3/2004   Lowe et al.
8,773,430 B2 *   7/2014   Zhang .................... G06T 7/593
345/419

(Continued)

FOREIGN PATENT DOCUMENTS

WO   2013/092666   6/2013

OTHER PUBLICATIONS

Berner, R., Brandli, C., Yang, M., Liu, S.-C., Delbruck, T., 2013. A 240 × 180 10 mW 12us Latency Sparse-Output Vision Sensor for Mobile Applications, in: 2013 Symposium on VLSI Circuits (VLSIC). Presented at the 2013 Symposium on VLSI 15 Circuits (VLSIC), pp. C186-C187.

(Continued)

*Primary Examiner* — Hadi Akhavannik
(74) *Attorney, Agent, or Firm* — JMB Davis Ben-David

(57) ABSTRACT

The present invention relates to a method for tracking a position of at least one keypoint in an image of an object moving relative to an optical sensor, wherein light reflected from the object (12) is detected so as to generate an image of the object, and wherein a position of at least one keypoint ($K^j$) in said image is detected and updated using temporal contrast events (Ev) of the optical sensor. The invention also relates to a corresponding computer program and device.

14 Claims, 4 Drawing Sheets

(51) Int. Cl.
- *G06K 9/60* (2006.01)
- *G06K 9/62* (2006.01)
- *G06T 7/246* (2017.01)
- *G06T 7/73* (2017.01)

(52) U.S. Cl.
CPC ............ *G06K 9/6288* (2013.01); *G06T 7/248* (2017.01); *G06T 7/73* (2017.01)

(56) References Cited

U.S. PATENT DOCUMENTS

| | | | |
|---|---|---|---|
| 2008/0135731 | A1 | 6/2008 | Lichtsteiner et al. |
| 2009/0238460 | A1* | 9/2009 | Funayama ............ G06K 9/4671 382/181 |
| 2013/0217996 | A1* | 8/2013 | Finkelstein .......... A61B 5/1075 600/407 |
| 2014/0052555 | A1* | 2/2014 | MacIntosh ........... G06Q 20/208 705/23 |

OTHER PUBLICATIONS

Calonder, M., Lepetit, V., Strecha, C., Fua, P., 2010. BRIEF: Binary Robust 20 Independent Elementary Features, in: Daniilidis, K., Maragos, P., Paragios, N. (Eds.), Computer Vision—ECCV 2010, Lecture Notes in Computer Science. Springer Berlin Heidelberg, pp. 778-792.

Canny, J., 1986. A Computational Approach to Edge Detection. IEEE Transactions on Pattern Analysis and Machine Intelligence PAMI-8, 679-698. 25 doi:10.1109/TPAMI.1986.4767851.

Leutenegger, S., Chli, M., Siegwart, R.Y., 2011. BRISK: Binary Robust invariant scalable keypoints, in: 2011 IEEE International Conference on Computer Vision 30 (ICCV). Presented at the 2011 IEEE International Conference on Computer Vision (ICCV), pp. 2548-2555. doi:10.1109/ICCV.2011.6126542.

Mair, E., Hager, G.D., Burschka, D., Suppa, M., Hirzinger, G., 2010. Adaptive and Generic Corner Detection Based on the Accelerated Segment Test, in: Daniilidis, K., Maragos, P., Paragios, N. (Eds.), Computer Vision—ECCV 2010, Lecture Notes in Computer Science. Springer Berlin Heidelberg, pp. 183-196.

Rosten, E., Drummond, T., 2006. Machine Learning for High-Speed Corner 10 Detection, in: Leonardis, A., Bischof, H., Pinz, A. (Eds.), Computer Vision—ECCV 2006, Lecture Notes in Computer Science. Springer Berlin Heidelberg, pp. 430-443.

Censi Andrea et al: "Low-latency event-based visual odometry", 2014 IEEE International Conference on Robotics and Automation (ICRA), IEEE, May 31, 2014 (May 31, 2014), pp. 703-710.

Weikersdorfer David et al: "Event-based 3D SLAM with a depth-augmented dynamic vision sensor", 2014 IEEE International Conference on Robotics and Automation (ICRA), IEEE, May 31, 2014 (May 31, 2014), pp. 359-364.

* cited by examiner

METHOD FOR TRACKING KEYPOINTS IN A SCENE

CROSS-REFERENCE TO RELATED APPLICATIONS

This is the U.S. National Stage of International Application No. PCT/EP2015/067091 filed Jul. 24, 2015, which was published in English under PCT Article 21(2), and which in turn claims the benefit of European Patent Application No. 14178447.0 filed Jul. 24, 2014.

The present invention relates to a method, a computer program and a device for tracking visual keypoints using temporal contrast events.

Particularly for mobile platforms/devices such as mobile robots, mobile devices (smartphones and tablets) or wearable computers (e.g. smart glasses or smart watches) that perform real-time interaction with the world, low latencies and low power consumption are important. These platforms can be equipped with computer vision systems for localization and mapping (SLAM) applications, mobile augmented reality (AR) or depth estimation. Current computer vision techniques are based on images and thus they are either having a low latency because of a high frame rate or a low power consumption because of a low frame rate. To achieve low latency and low power consumption, the processing has to be efficient. Event-based temporal contrast sensors (e.g. [7] (numbers in square brackets refer to the references below) allow more efficient processing of the visual information because they suppress redundant information already on the pixel level. One main problem with these sensors is that their output is not compatible with existing frame-based machine vision algorithms and systems. Many of these algorithms are based on locating, identifying and matching specific keypoints in a frame (e.g. [8], [5]). A keypoint is a point in an image (e.g. x and y coordinates) that denotes a specific area or feature such as an edge, a corner or a blob or other features that are characteristic for a scene. Keypoints are reliably detected at the same spot in different images of the same scene using methods such as edge, corner or blob detectors. Since these points are characteristic for the scene, their environment can be described using keypoint descriptors which allow to compare different sets of keypoints in different images. In this way two images can be compared and correspondences of characteristic points can be established. Most keypoints only change their position in between two images (also denotes as frames) and therefore it would be desirable to track their position without re-evaluating the whole image.

This problem is solved by a method having the features of claim 1. Embodiments are stated in the sub claims or are described below.

According to claim 1, the method for tracking a position of at least one keypoint in an image of an object as viewed by an optical sensor (or optical sensor means) moving relative to the object (here relative means that the optical sensor moves while the objects rests or vice versa or that the optical sensor as well the object moves), comprising the steps of:

a) detecting light reflected from the object so as to generate an image of the object comprising image pixels, wherein a pixel value is assigned to each image pixel, wherein each pixel value is monotonically related to the intensity of the detected light for the respective image pixel (the object may be illuminated with light of preferably constant intensity provided by a light source, which may also include natural light provided by the sun as light source), b) detecting a position of at least one keypoint ($K^j$) in said image, c) detecting light reflected by the object by means of the optical sensor that comprises a plurality of sensor pixels, wherein a pixel coordinate (u,v) is associated to each sensor pixel (which coordinates are particularly aligned with the coordinates of said image pixels of said image, e.g., a corresponding coordinate mapping is known or determined in beforehand), and wherein each sensor pixel generates a photocurrent being proportional to the intensity of the light impinging on the respective sensor pixel, and a signal related to said photocurrent, and wherein each sensor pixel outputs a temporal contrast event (Ev) merely when the respective signal due to the light impinging on the respective sensor pixel increases by an amount being larger than a first threshold ($\Theta_{ON}$) or decreases by an amount being larger than a second threshold ($\Theta_{OFF}$) since the last temporal contrast event (Ev) from the respective sensor pixel, wherein each temporal contrast event (Ev(u,v,t)) carries the coordinates (u,v) of its associated sensor pixel, a time (t) at which the respective temporal contrast event (Ev) occurred, as well as a polarity value indicating whether the respective temporal contrast event (Ev) is an ON event (e.g. polarity value of +const (e.g. +1)) at which said signal increased by an amount larger than said first threshold ($\Theta_{ON}$), or an OFF event (e.g. polarity value of −const (e.g. −1)) at which said signal decreased by an amount larger than said second threshold ($\Theta_{OFF}$), d) updating the position of the at least one keypoint ($K^j$) using said temporal contrast events (Ev), and e) preferably repeating steps c) to d) until a new image is generated in which case steps a) to e) are performed where said image in step a) now is said new image.

Of course, also a plurality of keypoints K may be detected. Further, a variety of different keypoints obeying one or several criteria can be tracked/detected. The present invention relates particularly to the tracking. A prominent example of a well known keypoint is a corner which may be detected using the FAST corner detector algorithm [10] which may also be used in the present invention. Keypoints can also be detected using blob detectors such as the ones used in the SIFT [8] or SURF [5], other corner detectors such as the ones used in the AGAST [9] or BRISK [6] algorithm or edge detectors such as the Canny edge detector [4].

In other words, the present invention relates to a method (as well as a computer program and a device, see below) that allows for tracking keypoints using asynchronous temporal contrast events. The temporal contrast events can be produced at a low latency, low power, high temporal resolution and over a high dynamic range. The invention allows exploiting these characteristics in the field of keypoint-based machine vision applications. The invention is based on the idea of detecting keypoints in an (e.g. intensity) image (also denoted image frame in order to distinguish said image from the asynchronously sampled contrast events) and using the temporal contrast events to update their position. Said image and the temporal contrast events can either be aligned using an optical sensor with two readout modes or by using two calibrated separate sensors, i.e. an optical sensor that provides the temporal contrast events and a further optical sensor that provides the whole image at once. One such sensor that has two readout modes is the dynamic and active pixel vision sensor (DAVIS, see e.g. PCT/EP2012/076093 for details which is incorporated herein by reference) which consists of pixels that detect temporal contrast events that are communicated asynchronously but also allows to read out a full intensity image frame. This dual readout is possible because the current which is proportional to the light intensity is not consumed to compute the temporal contrast events and therefore it can be used to compute also the absolute intensity (e.g. [1], [2]).

According to an embodiment of the method according to the invention step b) further comprises the steps of
- particularly assigning a descriptor vector to the at least one keypoint ($K^j$) (particularly, such a descriptor vector describes surrounding image pixels of the at least one keypoint in the form of a vector, whereas the descriptor method particularly delivers similar vectors for the same keypoint in another image which has been transformed, and wherein the descriptor vectors particularly differ (e.g. as much as possible) for different keypoints; for certain tasks it may not be required to have a descriptor for the keypoint, and an identifier is sufficient, e.g. monocular structure from motion).
- generating an image patch, wherein the image patch assigns to a pre-defined number of image pixels arranged around the at least one keypoint $K^j$ the pixel value of the respective image pixel of the image patch, and particularly
- computing at least one gradient patch along a degree of freedom of the image patch, wherein said at least one gradient patch assigns to each image pixel of the image patch a gradient of the pixel values of the image patch at the respective image pixel along said degree of freedom (the degree of freedom can be e.g. one of the translational degrees of freedom, say in x-, y-, or z-direction or a rotational degree of freedom, see for instance below; this also holds for the computer program and device according to the invention).

According to a further embodiment of the method according to the invention, step c) further comprises the steps of:
- storing a number N of the most recent temporal contrast events $B^j$ within the extent of the at least one gradient patch around the latest position of the at least one keypoint,
- particularly computing a temporal contrast patch $S_E$ by summing the weighted polarity values of the stored temporal contrast events according to their position (x,y) within the temporal contrast patch,
- particularly computing a comparison between the at least one gradient patch and the temporal contrast patch, and
- particularly computing a motion of the at least one keypoint in the image along said degree of freedom using said comparison, e.g. by maximizing the similarity using said computed comparison.

According to a further embodiment of the method according to the invention, step d) further comprises updating the position of the at least one gradient patch associated to the at least one keypoint using said motion along said degree of freedom.

Further, according to an embodiment of the method according to the invention, the following temporal contrast events are stored in step c):

$$B^j = \{Ev(x,y,t):(d((x,y,t),K^j)<\theta) \cap (|B|=N) \cap (\nabla t > \nabla \hat{t} \in \widehat{B^j})\},$$

$$\widehat{B^j} = \{(Ev(\hat{x},\hat{y},\hat{t}):d(\hat{x},\hat{y},\hat{t}),K^j)<\theta) \cap (Ev(\hat{x},\hat{y},\hat{t}) \notin B^j)\}$$

I.e. the buffer $B^j$ for the keypoint $K^j$ with index j contains the latest N events Ev(x,y,t) that are within a certain distance $\theta$ from the keypoint $K^i$ using a metric d( ).

This metric d( ) may contain spatial and temporal components which guarantee that only the most relevant events in the neighbourhood of the keypoint are buffered.

As already indicated above, according to a variant of the method according to the invention said image is also sampled with said optical sensor, i.e. the optical sensor is designed to both generate said temporal contrast events as well as to sample the whole image/scene at once. Alternatively, said image may be sampled by a further (frame-based) optical sensor that is aligned with the other optical sensor/temporal contrast events. I.e. a coordinate mapping between the two sensors is known or can be established by a calibration.

Further, according to an embodiment of the method according to the invention, the temporal contrast patch ($S_E$) for a keypoint $K^j$ is computed according to $$S_E^j(x, y) = \sum_{p^j(x,y)} w(Ev)$$

wherein all Events the according buffer are summed per pixel $p^i$ using a weighing function w( ).

$$P^j(x,y) = \{Ev(x',y',t):Ev \in B^j \cap x=x' \cap y=y'\}.$$

Further according to an embodiment of the method, the weighing function w( ) is +1 for all events with ON polarity and −1 for all events with OFF polarity. Other embodiments of the method may use a constant value or a function that assigns a weight according to the some spatial or temporal criteria (e.g. old events count less). To avoid that the cross-correlation peaks at the biggest spatial contrast instead of the best matching, the mean score is particularly subtracted of all pixels in the temporal contrast patch (zero-mean cross-correlation).

$$S_E^j(x, y) = \sum_{p^j(x,y)} w(Ev) - \frac{|\{(x, y): \exists Ev(x, y, t) \in B^j\}|}{\sum_{\{(x,y):\exists Ev(x,y,t) \in B^j\}} S_E^j}$$

Further, according to an embodiment of the method according to the invention, said motion ($\Delta x$) is computed by comparing and maximising the similarity of the temporal contrast patch and the spatial gradient patch. According to an embodiment of the method said comparison may be the cross-correlation and the motion is computed according to $$\Delta x = \text{argmax}_x \left( \left( \frac{dI}{dx} * S_E \right)(x) \right),$$

wherein * denotes the cross-correlation between the at least one gradient patch dI/dx and the temporal contrast patch $S_E$.

Of course, also a plurality of gradient patches (dI/dx, dI/dy, dI/dz, dI/dα, dI/dβ dI/dγ, cf. also FIG. 4) corresponding to several degrees of freedom (e.g. x and y spanning the image plane for instance) of the image patch may be computed, wherein the respective gradient patch assigns to each image pixel of the image patch I a gradient of the pixel values of the image patch I at the respective image pixel along the respective degree of freedom.

According to a further embodiment of the method according to the invention said comparison is computationally simplified by pre-computing the maximally scoring temporal contrast patch for a fixed amount of said motion (e.g. $\Delta x$).

Said maximally scoring temporal contrast patches are multiplied with said event buffer ($B^j$) to determine the most probable of said fixed amounts of motion.

Particularly, the gradient along said two planar translational degrees of freedom x, y may be approximated by using convolutional approaches, e.g. in the form of Sobel convolution kernels for the two dimensions of the (intensity) image. The convolution kernels may have an extent of 3×3 and have the following form:

$$G_x = \begin{bmatrix} -1 & 0 & +1 \\ -2 & 0 & +2 \\ -1 & 0 & +1 \end{bmatrix}$$

$$G_y = \begin{bmatrix} +1 & +2 & +1 \\ 0 & 0 & 0 \\ -1 & -2 & -1 \end{bmatrix}$$

$$\frac{dI}{dx} = G_x * I$$

$$\frac{dI}{dy} = G_y * I$$

The intensity gradients along z and along the rotational degrees of freedom may be computed keypoint-specific (keypoint $K^j$ having coordinates $x^j$ and $y^j$).

$$G_\rho = \begin{bmatrix} -\cos\rho + \sin\rho & 2\sin\rho & \cos\rho + \sin\rho \\ -2\cos\rho & 0 & 2\cos\rho \\ -\cos\rho - \sin\rho & -2\sin\rho & \cos\rho - \sin\rho \end{bmatrix}$$

$$\frac{dI^j}{dz} = G_\rho * I(x^l, y^l), \rho = \tan^{-1}\left(\frac{y^l - y^j}{x^l - x^j}\right)$$

For the z derivative, the values directly around the keypoint may be ignored or computed differently because the rotated Sobel kernel is meaningless directly around the keypoint.

$$\frac{dI^j}{d\alpha} = (\text{sign}(y^l - y^j) \cdot G_y) * I(x^l, y^l)$$

$$\frac{dI^j}{d\beta} = (\text{sign}(x^l - x^j) \cdot G_x) * I(x^l, y^l)$$

As for the z derivative the values around the keypoint may be neglected: For the $\alpha$ derivative, the ones with similar y coordinates and for the $\beta$ derivative, the ones with similar x coordinates.

$$\frac{dI^j}{d\gamma} = G_\rho * (x^l, y^l)$$

$$\rho = \tan^{-1}\left(\frac{y^l - y^j}{x^l - x^j}\right) + \frac{\Pi}{2}$$

Also for the $\gamma$ derivative, the values around the keypoint may be neglected.

Furthermore, the problem underlying the present invention is solved by a computer program according to claim 13.

According thereto, the computer program for tracking a position of at least one keypoint in an image of an object moving relative to an optical sensor or an optical sensor means comprises program code for conducting the following steps when the computer program is executed on a computer (or a processing unit of the device according to the invention):

a) detecting a position of at least one keypoint $K^j$ in said image, b) updating the position of the at least one keypoint $K^j$ using temporal contrast events Ev output by an optical sensor merely when a signal of the optical sensor related to a photocurrent due to the light impinging on a sensor pixel of the optical sensor increases by an amount being larger than a first threshold ($\Theta_{ON}$) or decreases by an amount being larger than a second threshold ($\Theta_{OFF}$) since the last temporal contrast event from the respective sensor pixel, wherein each temporal contrast event Ev(u,v,t) carries the coordinates (u,v) of its associated sensor pixel, a time t at which the respective temporal contrast event Ev occurred, as well as a polarity value indicating whether the respective temporal contrast event Ev is an ON event at which said signal increased by an amount larger than said first threshold, or an OFF event at which said signal decreased by an amount larger than said second threshold, and c) particularly repeating steps a) to b) until a new image is provided in which case steps a) to c) are performed, where said image in step a) now is said new image.

According to an embodiment of the computer program according to the invention step a) further comprises the steps of particularly assigning a descriptor vector to the at least one keypoint ($K^j$) (see also above), generating an image patch I, wherein the image patch assigns to a pre-defined number of image pixels arranged around the at least one keypoint image pixel ($K^j$) the pixel value of the respective image pixel of the image patch, and particularly computing at least one gradient patch along a degree of freedom of the image patch, wherein said at least one gradient patch assigns to each image pixel of the image patch a gradient of the pixel values of the image patch at the respective image pixel along said degree of freedom, According to an embodiment of the computer program according to the invention step b) further comprises the steps of storing a number N of the most recent temporal contrast events $B^j$ within the extent of the at least one gradient patch around the latest position of the at least one keypoint K, computing a temporal contrast patch $S_E$ by summing the weighted polarity values of the stored temporal contrast events $B^j$ according to their position within the temporal contrast patch, computing a comparison between the at least one gradient patch and the temporal contrast patch, and computing the motion of the at least one keypoint $K^j$ in the image along said degree of freedom using said computed comparison.

According to an embodiment of the computer program according to the invention step b) further comprises updating the position of the gradient patch associated to the keypoint using said motion along said degree of freedom.

Further, according to an embodiment of the computer program according to the invention step b) further comprises storing of the following most recent temporal contrast events ($B^j$)

$$B^j = \{Ev(x,y,t):(d((x,y,t),K^j)<\theta)\cap(|B|=N)\cap(\nabla t>\nabla \hat{t}\in \widehat{B}^j)\},$$

$$\widehat{B}^j = \{(Ev(\hat{x},\hat{y},\hat{t}):d(\hat{x},\hat{y},\hat{t}),K^j)<\theta)\cap(Ev(\hat{x},\hat{y},\hat{t})\notin B^j)\}$$

Further, according to an embodiment of the computer program according to the invention, the temporal contrast patch $S_E$ is particularly computed according to $$S_E^j(x,y) = \sum_{P^j(x,y)} w(Ev) - \frac{|\{(x,y):\exists\ Ev(x,y,t)\in B^j\}|}{\sum_{\{(x,y):\exists Ev(x,y,t)\in B^j\}}} S_E^j$$

wherein $$P^j(x,y) = \{Ev(x',y',t):Ev\in B^j\cap x=x'\cap y=y'\}$$

Further, according to an embodiment of the computer program according to the invention, said motion is computed according to $$\Delta x = \mathrm{argmax}_x\left(\left(\frac{dI}{dx}*S_E\right)(x)\right),$$

wherein * denotes the zero-mean cross-correlation between the at least one gradient patch and the temporal contrast patch $S_E$.

Further, according to an embodiment of the computer program according to the invention a plurality of gradient patches (dI/dx, dI/dy, dI/dz, dI/dα, dI/dβ, dI/dy) corresponding to several degrees of freedom of the image patch are computed, wherein the respective gradient patch assigns to each image pixel of the image patch a gradient of the pixel values of the image patch at the respective image pixel along the respective degree of freedom.

Further, according to an embodiment of the computer program according to the invention said comparison is a zero-mean cross correlation.

Furthermore, the problem according to the invention is solved by a device according to claim 14. In particular, according to embodiments of the present invention, such a device can be one of:
a mobile device,
a wearable computer,
a smartphone,
a tablet computer,
(e.g. smart) glasses,
a (e.g. smart) watch,
a mobile robot,
a (e.g. micro) air vehicle (e.g. drone).

According to claim 14, the device for tracking a position of at least one keypoint in an image of an object moving relative to an optical sensor means (or optical sensor), comprises
an optical sensor means that is designed to detect light reflected from an object and to generate an image of the object comprising image pixels, wherein a pixel value is assigned to each image pixel, wherein each pixel value is monotonically related to the intensity of the detected light for the respective image pixel, wherein the device (or a processing unit of the device on which e.g. a computer program is executed like the computer program according to the present invention) is designed to detect a position of at least one keypoint ($K^j$) in said image, and wherein said optical sensor means is further designed to detect light reflected by the object by means of a plurality of sensor pixels, wherein a pixel coordinate (u,v) is associated to each sensor pixel, and, wherein each sensor pixel is designed to generate a photocurrent being proportional to the intensity of the light impinging on the respective sensor pixel, and to generate a signal related to said photocurrent, and wherein each sensor pixel is designed to output a temporal contrast event (Ev) merely when the respective signal due to the light impinging on the respective sensor pixel increases by an amount being larger than a first threshold ($\Theta_{ON}$) or decreases by an amount being larger than a second threshold ($\Theta_{OFF}$) since the last temporal contrast event (Ev) from the respective sensor pixel, wherein each temporal contrast event (Ev(u,v,t)) carries the coordinates (u,v) of its associated sensor pixel, a time (t) at which the respective temporal contrast event (Ev) occurred, as well as a polarity value indicating whether the respective temporal contrast event (Ev) is an ON event at which said signal increased by an amount larger than said first threshold ($\Theta_{ON}$), or an OFF event at which said signal decreased by an amount larger than said second threshold ($\Theta_{OFF}$).

According to another aspect of the present invention, the device is designed to conduct the method according to the invention.

Further, according to an embodiment of the device according to the invention, the device (e.g. the processing unit executing e.g. said computer program) is designed to update the position of the at least one keypoint $K^j$ using said temporal contrast events.

Further, according to an embodiment of the device according to the invention, the device is designed to assign a descriptor vector or an identifier (see also above) to the at least one keypoint ($K^j$).

Further, according to an embodiment of the device according to the invention, the device (e.g. the processing unit executing e.g. said computer program) is designed to generate an image patch that assigns to a pre-defined number of image pixels arranged around the at least one keypoint the pixel value of the respective image pixel of the image patch.

Further, according to an embodiment of the device according to the invention, the device (e.g. the processing unit executing e.g. said computer program) is designed to compute at least one gradient patch along a degree of freedom of the image patch, wherein said at least one gradient patch assigns to each image pixel of the image patch a gradient of the pixel values of the image patch at the respective image pixel along said degree of freedom.

Further, according to an embodiment of the device according to the invention, the device (e.g. the processing unit executing e.g. said computer program) is designed to store a number N of the most recent temporal contrast events $B^j$ within the extent of the at least one gradient patch around the latest position of the at least one keypoint.

Further, according to an embodiment of the device according to the invention, the device (e.g. the processing unit executing e.g. said computer program) is designed to compute a temporal contrast patch $S_E$ by summing the weighted polarity values of the stored temporal contrast events $B^j$ according to their position (x,y) within the temporal contrast patch, Further, according to an embodiment of the device according to the invention, the device (e.g. the processing unit executing e.g. said computer program) is designed to compute a comparison (e.g. a cross-correlation) between the at least one gradient patch and the temporal contrast patch, and to compute the motion of the at least one keypoint in the image along said degree of freedom using said computed comparison.

Further, according to an embodiment of the device according to the invention, the device (e.g. the processing unit executing e.g. said computer program) is further designed to update the position of the gradient patch associated to the at least one keypoint using said motion along said degree of freedom.

Further, according to an embodiment of the device according to the invention, the device (e.g. the processing unit executing e.g. said computer program) is designed to store the following most recent temporal contrast events ($B^j$) for each keypoint $$B^j = \{Ev(x,y,t) : (d((x,y,t), K^j) < \theta) \cap (|B| = N) \cap (\forall t > \forall \hat{t} \in \widehat{B^j})\},$$

$$\widehat{B^j} = \{(Ev(\hat{x}, \hat{y}, \hat{t}) : d(\hat{x}, \hat{y}, \hat{t}), K^j) < \theta) \cap (Ev(\hat{x}, \hat{y}, \hat{t}) \notin B^j)\}$$

(see also above).

Further, according to an embodiment of the device according to the invention, the optical sensor means is formed as a single optical sensor that is designed to sample or generate said image as well as to sample or generate said temporal contrast events so that the temporal contrast events are aligned with said image.

Further, according to an alternative embodiment of the device according to the invention, the sensor means comprises an optical sensor designed to generate said temporal contrast events as well as a separate further optical sensor designed to sample/generate said image, which further optical sensor is aligned with the optical sensor, so that the temporal contrast events are aligned with said image.

Further, according to an embodiment of the device according to the invention, the device (e.g. the processing unit executing e.g. said computer program) is designed to compute the temporal contrast patch ($S_E$) (see also above) according to $$S_E^j(x, y) = \sum_{P^j(x,y)} w(Ev) - \frac{|\{(x, y) : \exists Ev(x, y, t) \in B^j\}|}{\sum_{\{(x,y) : \exists Ev(x,y,t) \in B^j\}} S_E^j}$$

wherein $$P^j(x,y) = \{Ev(x',y',t) : Ev \in B^j \cap x = x' \cap y = y'\}$$

Further, according to an embodiment of the device according to the invention, the device (e.g. the processing unit executing e.g. said computer program) is designed to compute said motion according to $$\Delta x = \text{argmax}_x \left( \left( \frac{dI}{dx} * S_E \right)(x) \right),$$

wherein * denotes the zero-mean cross-correlation between the at least one gradient patch dI/dx and the temporal contrast patch $S_E$.

Further, according to an embodiment of the device according to the invention, the device (e.g. the processing unit executing e.g. said computer program) is designed to compute a plurality of gradient patches (dI/dx, dI/dy, dI/dz, dI/dα, dI/dβ, dI/dy) corresponding to several degrees of freedom of the image patch, wherein the respective gradient patch assigns to each image pixel of the image patch a gradient of the pixel values of the image patch at the respective image pixel along the respective degree of freedom.

The way of tracking keypoints of the present invention has a low latency and power consumption and is therefore highly useful on mobile platforms that interact with or display their environment including mobile computers (such as tablets, laptops), mobile phones (such as smart phones), wearable computers (such as smart watches or smart glasses), autonomous or remote controlled robots (such as microaerial vehicles or legged robots).

In the following, further advantages and features of the present invention as well as embodiments of the present invention are described with reference to the Figures, wherein.

The present invention relates to a method/algorithm, computer program and a device that allow for automatically tracking keypoints in images of objects 12 using asynchronous temporal contrast events. The temporal contrast events can be produced at a low latency, low power, high temporal resolution and over a high dynamic range. The invention allows exploiting these characteristics in the field of keypoint-based machine vision applications. Particularly, the invention is based on the idea of detecting keypoints K in an (e.g. intensity) image frame and using the temporal contrast events to update their position. The image frame and the temporal contrast events can either be aligned using an optical sensor with two readout modes such as an dynamic and active pixel vision sensor (DAVIS) [1,2] or by using two calibrated separate optical sensors 13, 14 as shown in FIG. 2.

Particularly, the main assumption behind the present invention is that if the illumination of a scene stays constant, all temporal contrast events are caused by the spatial contrast moving relative to the optical sensor(s) 13, 14. Matching the temporal contrast to the spatial contrast in the environment of a keypoint thereby allows inferring the motion of the keypoint.

Figure 1:
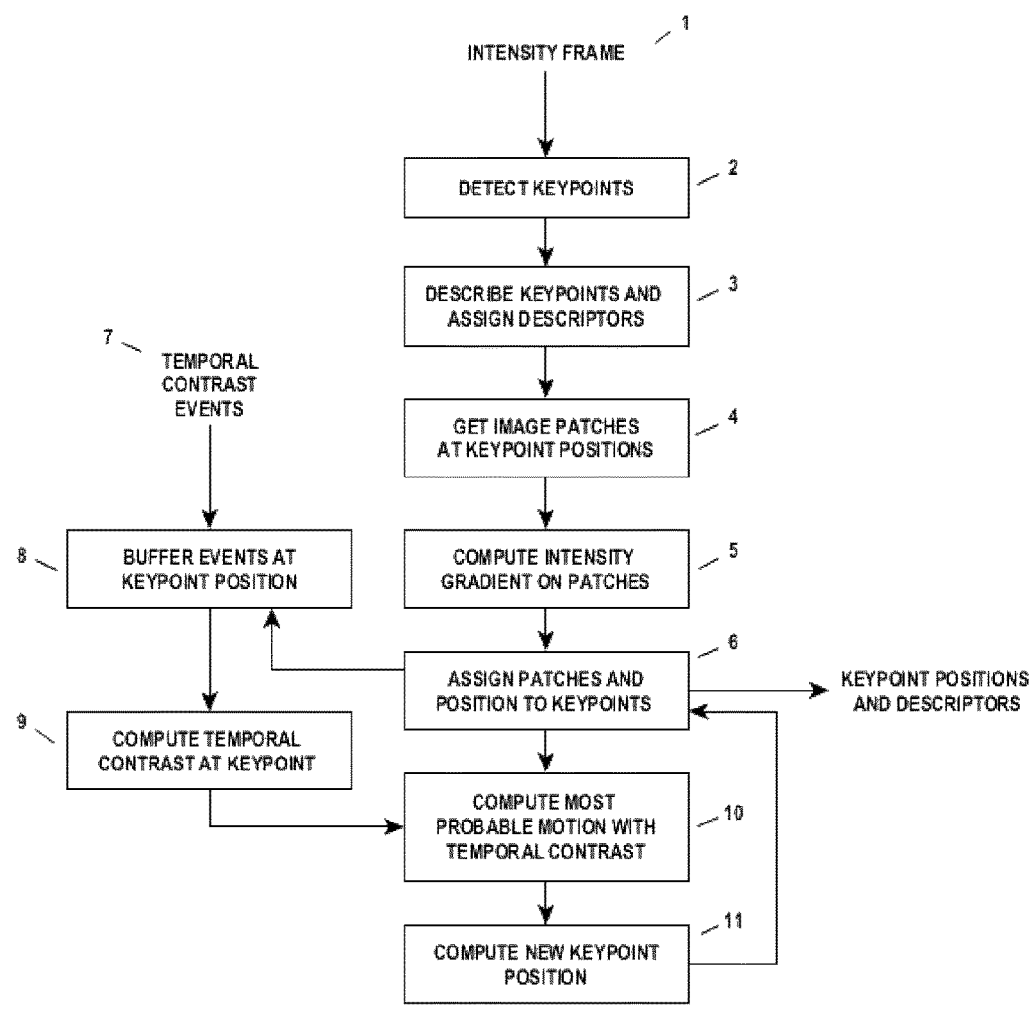
FIG. 1 shows a flowchart of a process to track keypoints based on temporal contrast events.
Figure 2:
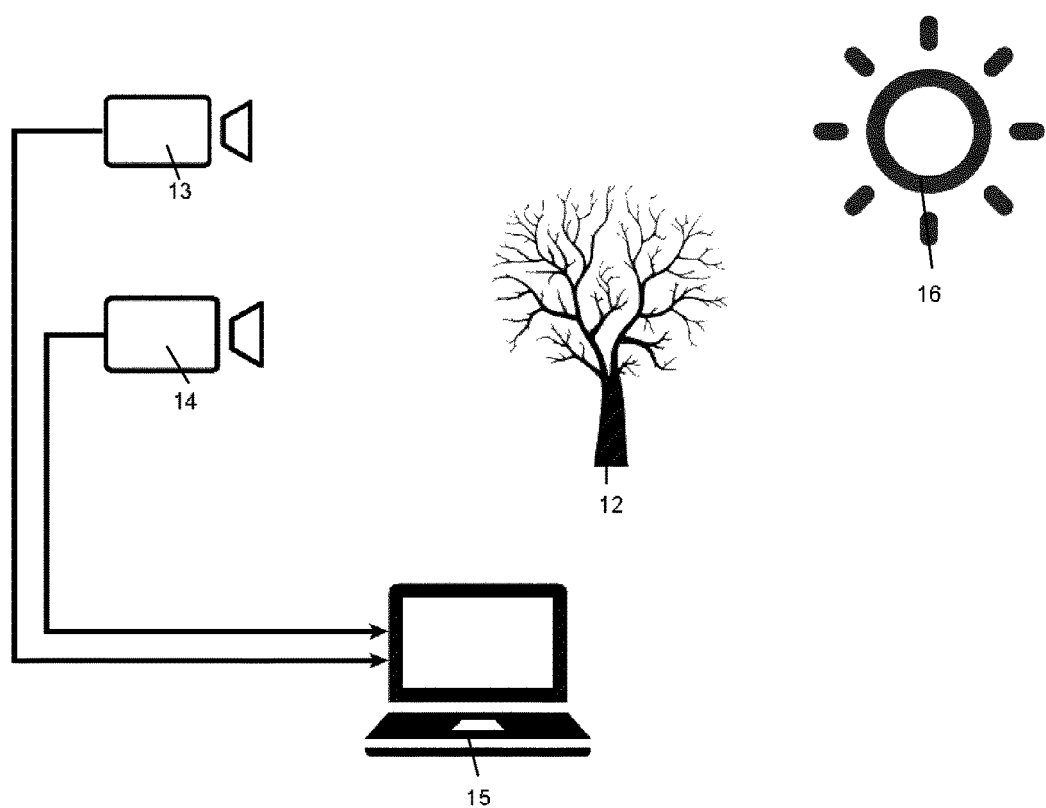
FIG. 2 shows a schematical pictorial representation of an embodiment of a device/apparatus for keypoint tracking based on temporal contrast events.
Figure 3:
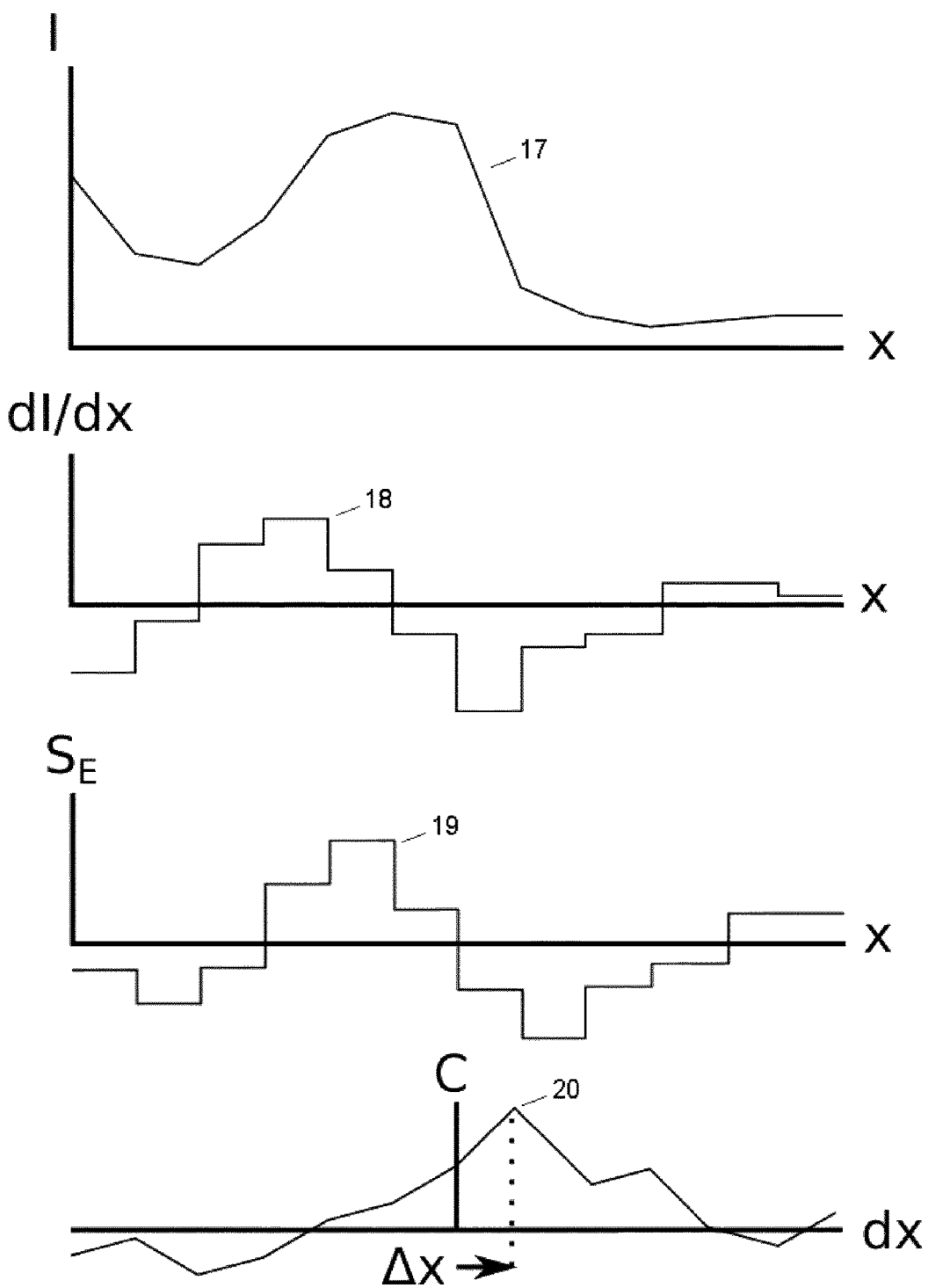
FIG. 3 is a diagram of an exemplary computation of the 1 dimensional motion of a keypoint.
Figure 4:
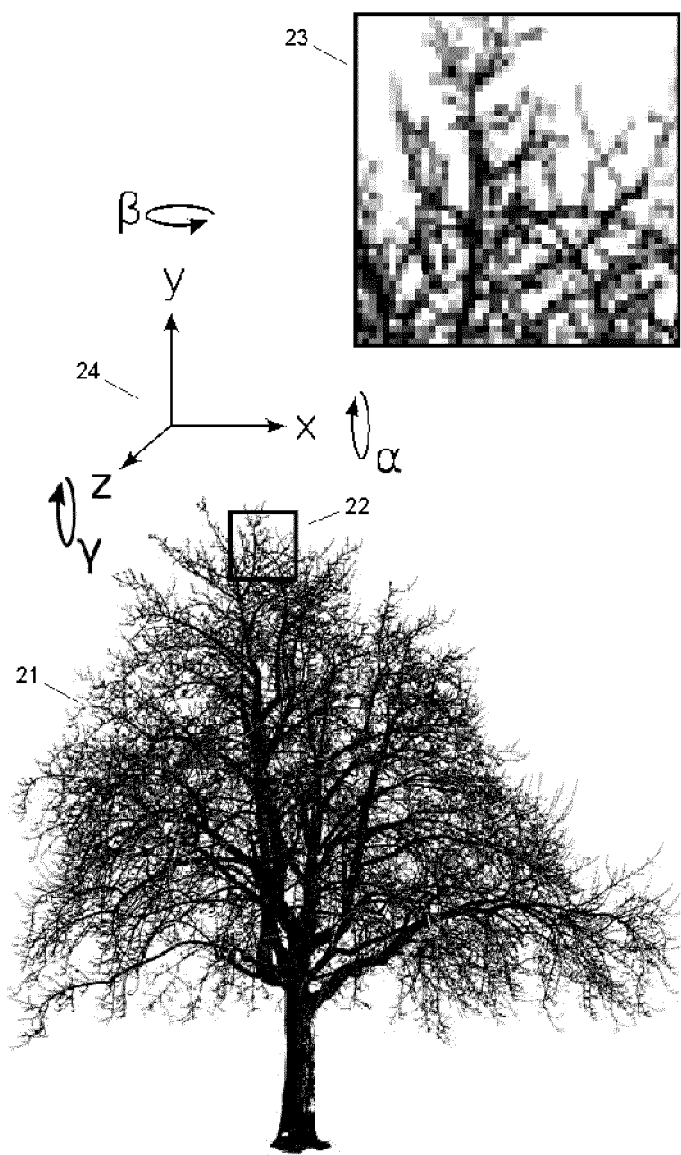
FIG. 4 illustrates the coordinate system used.

As depicted in FIG. 2, a first embodiment of the invention comprises an analyzing means, e.g. a computer 15, that may also be integrated into a device according to the invention, which shall be capable of tracking a keypoint in an image (also denoted as intensity image or image frame or intensity image frame) that is e.g. sampled by the same device via an optical sensor (also denoted temporal contrast sensor) 14 (or two optical sensors 13, 14) which is/are aimed at the scene or one or several objects to be analyzed such as a tree 12 shown in FIGS. 1 and 4. If only one (temporal contrast) sensor 14 is used, it needs to have the possibility to acquire (intensity) images of the scene e.g. [1] for the whole image frame. If this is not the case, a second, frame-based optical sensor (e.g. camera) 13 may be used in addition (see above).

This frame-based optical sensor 13 is particularly calibrated in a way that a coordinate mapping between the two sensors 13, 14 can be established. The sensors 13, 14 can observe the scene from varying positions. A light source 16, which may be the sun does not change its intensity or only slowly (timescale lager than seconds) while the scene is observed. The method and computer program of present invention are executed on a computer or said processing unit 15, which may be integrated into the device according to the invention. Said computer or processing unit 15 particularly comprises a means for storing and processing the incoming images and events. Said processing comprises basic operations required for the execution of the present invention. Said computer or processing unit 15 may be operated synchronously or asynchronously. Said storing means may be analog or digital. Said processing may be executed in serial or in parallel.

According to FIG. 1 in a first step the (e.g. intensity) image frame T is acquired 1 and sent to the computer 15 where it is converted to grayscale if necessary and normalized. The intensity image I may be log-compressed so that I=log(T). These steps may be done using an optical sensor in the form of a DAVIS sensor 14 connected through e.g. a USB cable to said computer or processing unit 15 which is a laptop in an example of the invention (i.e. HP EliteBook 8570p with a Intel Core i7-3740QM CPU and 16 GB RAM). This step may involve a change of the format in which the intensity frame (i.e. image) is stored and communicated.

The keypoints K which mark characteristic parts of the image are detected using a keypoint or feature detection method 2. Keypoints are points in the image (e.g. x and y coordinates) that denote specific areas such as edges, corners or blobs that are characteristic for a scene. They are reliably detected at the same spot in different images of the same scene using methods such as edge, corner or blob detectors. Since these points are characteristic for the scene, their environment can be described using keypoint descriptors which allow to compare different sets of keypoints in different images. This way two images can be compared and correspondences of characteristic points can be established. This step may be done using the FAST corner detector algorithm [10]. Keypoints can also be detected using blob detectors such as the ones used in the SIFT [8] or SURF [5], other corner detectors such as the ones used in the AGAST [9] or BRISK [6] algorithm or edge detectors such as the Canny edge detector [4]. Each image I contains a set of k coordinate tuples for the keypoints K:

$$K=\{(u_1,v_1),(u_2,v_2),\ldots,(u_k,v_k)\}$$

The keypoints K are described using keypoint or feature descriptors 3.

Each keypoint gets a spatial position, a descriptor vector (or short descriptor) 3, and a gradient patch 4 (see below) assigned and these tupels are stored to the memory. Said descriptor vector is computed using a descriptor method which should reliably produce the same but highly distinctive descriptor vector for the same keypoint under as many transformations (translation, rotation, scale, skew, brightness) as possible. Good keypoint descriptors produce different descriptor vectors for different keypoints, but the same descriptor vectors for the same keypoint in different images (different camera, different perspective, . . . ). Said descriptor may compute spatial gradients around the keypoint or binary pixel comparisons, order them in a rotation invariant method and collect the results in a vector. The spatial position and the descriptor vector may be communicated to other processes where they can be used for keypoint-based computer and machine vision.

Describing the keypoints using keypoint descriptors may be done using the BRISK keypoint descriptor [6] which does not require a lot of memory and can be matched with a low computational effort. Other descriptors to describe the keypoints include the SIFT[8], SURF [5] and BRIEF [3] descriptors.

Further, image patches of defined size around of the keypoints K are stored 4. These patches may have the size of the corner detector kernel. Particularly, (e.g. for the FAST corner dectector) such a patch may have an extent of 7×7 pixels with its keypoint in the middle.

The intensity gradients on the (intensity) image patch are computed 5. The intensity gradients can be computed along all degrees of freedom of the patch 24 independently (cf. FIG. 4). The degrees of freedom may be restricted to x-,y-translations within the plane of the image so that only the gradients along these axes dI/dx and dI/dy are computed. The gradient along said two planar translations may be approximated by using convolutional approaches. This step may be done using two Sobel convolution kernels for the two dimensions of the intensity image. The convolution kernels may have an extent of 3×3 and have the following form:

$$G_x = \begin{bmatrix} -1 & 0 & +1 \\ -2 & 0 & +2 \\ -1 & 0 & +1 \end{bmatrix}$$

$$G_y = \begin{bmatrix} +1 & +2 & +1 \\ 0 & 0 & 0 \\ -1 & -2 & -1 \end{bmatrix}$$

$$\frac{dI}{dx} = G_x * I$$

$$\frac{dI}{dy} = G_y * I$$

The computation of the intensity gradient along z and along the rotational degrees of freedom can be computed similarly.

In case a plurality of image patches is computed for one keypoint, they are particularly all assigned to the keypoint.

Particularly, the respective descriptor vector 3 is linked to the position of its associated keypoint. Particularly, this is done by keeping them in the same software object or by placing them close in memory (e.g. in a hardware solution). Such a link can also be established through an ID or an index shared among keypoint and descriptor.

An event-based sensor produces a stream of temporal contrast events 7. This stream may be produced by the optical sensor 14 (e.g. DAVIS) and transferred through e.g. USB to the computer 15. The output of this optical sensor 14 according to the invention is described as a set of temporal contrast events and each event Ev carries its u- and v-address, a timestamp and its polarity value (e.g. as a value of +1 if it is an ON event and a −1 for OFF events):

$$Ev(u, v, t) = \begin{cases} +1, & \text{if } \Delta \ln(I_{u,v}) > \theta_{ON}) \\ +1, & \text{if } \Delta \ln(I_{u,v}) < \theta_{ON}) \end{cases}$$

where Δ ln(Iu,v) denotes the change in illumination at the pixel with coordinates u, v since the last event. $\Theta_{ON}$ and $\Theta_{OFF}$ denote the event thresholds that must be crossed to trigger an event. These thresholds can be set independently which allows balancing the number of ON and OFF events.

The most recent events get buffered by storing them for the keypoint motion analysis 8. All events which are not in the surrounding of a keypoint may be get filtered out. The buffer criterion may be a number N of the last events within the extent of the gradient patch around the latest position of the keypoint. N may depend on the amount of contrast in the gradient patch. The buffered events B for keypoint j can be described as $$B^j = \{Ev(x,y,t) : (d((x,y,t), K^j) < \theta) \cap (|B| = N) \cap (\nabla t > \hat{V}t \in \widehat{B^j})\},$$

$$\widehat{B^j} = \{(Ev(\hat{x},\hat{y},\hat{t}) : d(\hat{x},\hat{y},\hat{t}), K^j) < \theta) \cap (Ev(\hat{x},\hat{y},\hat{t}) \notin B^j)\}$$

This formula describes a temporally ordered list as a set. In other words one may also state that B only keeps the latest events.

The buffered events are mapped to compute a temporal contrast patch $S_E$ 9. The temporal contrast patch is a spatial accumulation of the temporal contrast events that represents which regions got brighter and which regions got darker. The temporal contrast patch may be computed by summing the buffered temporal contrast events according to their spatial position within the patch, their polarity and arrival time using weighing function $w(\ )$.

$$S_E^j(x, y) = \sum_{P^j(x,y)} w(Ev) \cdot \frac{|\{(x, y) : \exists\, Ev(x, y, t) \in B^j\}|}{\sum_{\{(x,y) : \exists Ev(x,y,t) \in B^j\}} S_E^j}$$

wherein $$P^j(x,y) = \{Ev(x',y',t) : Ev \in B^j \cap x = x' \cap y = y'\}$$

The temporal contrast is used to infer the most probable motion of the spatial contrast patch that might have caused the temporal contrast patch 10. The motion of the patch 22, 23 is constrained to six degrees of freedom 24: the patch can translate along the three dimensions of space as well as rotate around them. If the patch moves along the z-axis, it moves closer to the observer and thereby become bigger. For motions along the x- and y-axis, the patch does not get distorted. A rotation around the z-axis does not lead to distortion of the patch but rotations along the other axes squeeze or stretch the patch.

The most probable motion is computed using the zero-mean cross-correlation or another suitable comparison between the gradient patch and the temporal contrast patch and determining the maximally scoring translation. The motion along all degrees of freedom is computed independently. For the motion in the x-direction $\Delta x$ and the motion in the y-direction $\Delta y$, this can be done in the following way:

$$\Delta x = \underset{x}{\mathrm{argmax}}\left(\left(\frac{dI}{dx}\right) * S_E\right)(x)$$

$$\Delta y = \underset{y}{\mathrm{argmax}}\left(\left(\frac{dI}{dy}\right) * S_E\right)(y)$$

In the same way the z-motion and the rotational motion can be estimated. To improve the performance of the present invention, the transformation and the according motions of the keypoints may be discretized and pre-computed. To perform said pre-computation, the respective image patch is moved for a fixed amount $m_x$ along a degree of freedom x and the difference of the image patch and the moved image patch is computed. This difference corresponds to the highest scoring temporal contrast patch for given fixed amount $m_x$ and can be used as transformation map M. The transformation map M can for computational efficiency be stored as integer or boolean values. For translations along the x- and y-axis, one pixel in both directions may be chosen as $m_x$ or $m_y$, respectively. Each new event in the buffer then gets multiplied with the value of the transformation map at the event coordinate. For each transformation map these multiplications are added up and as soon one transformation map scores better than a threshold, the keypoint is moved by the discrete amount $m_x$, $m_y$ which was used to compute the map, and the according transformation maps are reset. The threshold may depend on the contrast in an image patch or the sum of absolute values in a transformation map. The threshold may also be computed by a decaying value of the last transformation map or any other measure that indicates how probable it is that the patch did not move. This way of pre-computing the derivatives in a discrete form allows to reduce the computations executed on the arrival of a temporal contrast event to a few multiplications, additions and comparisons.

From an exemplary intensity distribution 17 along the x axis, the intensity gradient along the x-axis can be computed 18. By comparing, particularly cross-correlating, the intensity gradient patch with a possible temporal contrast patch 19, by means of any appropriate comparison measure (e.g. zero-mean cross-correlation, sum of squared differences, convolution, Euclidian or other distances in a compressed space such as PCA (principle component analysis), DFT (discrete Fourier transform) or DWT (discrete wavelet transform), etc.), a maximum in the measure C can be determined 20 and the according $\Delta x$ reveals the motion of the patch and the according keypoint along the degree of freedom x. This can also be conducted for the other degrees of freedom.

The computed spatial contrast patch motion is used to update the keypoint position which can then be communicated to the keypoint based processes 11.

The invention allows tracking keypoints in a visual scene with low latency.

REFERENCES

[1] Berner, R., Brandli, C., Yang, M., Liu, S.-C., Delbruck, T., 2013. A240×180 10 mW 12 us Latency Sparse-Output Vision Sensor for Mobile Applications, in: 2013 Symposium on VLSI Circuits (VLSIC). Presented at the 2013 Symposium on VLSI Circuits (VLSIC), pp. C186-C187.

[2] Berner, R., Delbrück, T., 2012. Photoarray, particularly for combining sampled brightness sensing with asynchronous detection of time-dependent image data. PCT patent application PCT/EP2012/076093

[3] Calonder, M., Lepetit, V., Strecha, C., Fua, P., 2010. BRIEF: Binary Robust Independent Elementary Features, in: Daniilidis, K., Maragos, P., Paragios, N. (Eds.), Computer Vision ECCV 2010, Lecture Notes in Computer Science. Springer Berlin Heidelberg, pp. 778-792.

[4] Canny, J., 1986. A Computational Approach to Edge Detection. IEEE Transactions on Pattern Analysis and Machine Intelligence PAMI-8, 679-698. doi:10.1109/TPAMI.1986.4767851

[5] Funayama, R., Yanagihara, H., Van, G. L., Tuytelaars, T., Bay, H., 2009. Robust Interest Point Detector and Descriptor. US2009238460 (A1).

[6] Leutenegger, S., Chli, M., Siegwart, R. Y., 2011. BRISK: Binary Robust invariant scalable keypoints, in: 2011 IEEE International Conference on Computer Vision (ICCV). Presented at the 2011 IEEE International Conference on Computer Vision (ICCV), pp. 2548-2555. doi:10.1109/ICCV.2011.6126542

[7] Lichtsteiner, P., Delbruck, T., 2008. Photoarray for Detecting Time-Dependent Image Data. US2008135731 (A1).

[8] Lowe, D. G., 2004. Method and apparatus for identifying scale invariant features in an image and use of same for locating an object in an image. U.S. Pat. No. 6,711,293 (B1).

[9] Mair, E., Hager, G. D., Burschka, D., Suppa, M., Hirzinger, G., 2010. Adaptive and Generic Corner Detection Based on the Accelerated Segment Test, in: Daniilidis, K., Maragos, P., Paragios, N. (Eds.), Computer Vision—ECCV 2010, Lecture Notes in Computer Science. Springer Berlin Heidelberg, pp. 183-196.

[10] Rosten, E., Drummond, T., 2006. Machine Learning for High-Speed Corner Detection, in: Leonardis, A., Bischof, H., Pinz, A. (Eds.), Computer Vision—ECCV 2006, Lecture Notes in Computer Science. Springer Berlin Heidelberg, pp. 430-443

The invention claimed is:

1. Method for tracking a position of at least one keypoint in an image of an object moving relative to an optical sensor, comprising the steps of:
  a) detecting light reflected from the object (12) and generating an image of the object (12) comprising image pixels, wherein a pixel value is assigned to each image pixel, wherein each pixel value is monotonically related to the intensity of the detected light for the respective image pixel,
  b) detecting a position of at least one keypoint ($K^j$) in said image, particularly assigning a descriptor vector to the at least one keypoint ($K^j$), generating an image patch (I), wherein the image patch (I) assigns to a pre-defined number of image pixels arranged around the at least one keypoint ($K^j$) the pixel value of the respective image pixel of the image patch (I), and computing at least one gradient patch (dI/dx) along a degree of freedom (x) of the image patch (I), wherein said at least one gradient patch (dI/dx) assigns to each image pixel of the image patch (I) a gradient of the pixel values of the image patch (I) at the respective image pixel along said degree of freedom,
  c) detecting light reflected by the object by means of the optical sensor (14) that comprises a plurality of sensor pixels, wherein each sensor pixel generates a photocurrent being proportional to the intensity of the light impinging on the respective sensor pixel, and generates a signal related to said photocurrent, and wherein each sensor pixel outputs a temporal contrast event (Ev) merely when the respective signal due to the light impinging on the respective sensor pixel increases by an amount being larger than a first threshold ($\Theta_{ON}$) or decreases by an amount being larger than a second threshold ($\Theta_{OFF}$) since the last temporal contrast event (Ev) from the respective sensor pixel, wherein each temporal contrast event (Ev(u,v,t)) carries the coordinates (u,v) of its associated sensor pixel, a time (t) at which the respective temporal contrast event (Ev) occurred, as well as a polarity value indicating whether the respective temporal contrast event (Ev) is an ON event at which said signal increased by an amount larger than said first threshold ($\Theta_{ON}$), or an OFF event at which said signal decreased by an amount larger than said second threshold ($\Theta_{OFF}$),
  d) updating the position of the at least one keypoint ($K^j$) using said temporal contrast events (Ev), and
  e) particularly repeating steps c) to d) until a new image is generated in which case steps a) to e) are conducted.

2. Method according to claim 1, characterized in that step c) further comprises the steps of:
  storing a number (N) of the most recent temporal contrast events ($B^j$) within the extent of the at least one gradient patch (dI/dx) around the latest position of the at least one keypoint ($K^j$),
  computing a temporal contrast patch ($S_E$) by summing the weighted polarity values of the stored temporal contrast events ($B^j$) according to their position (x,y) within the temporal contrast patch ($S_E$),
  computing a comparison (C) between the at least one gradient patch (dI/dx) and the temporal contrast patch ($S_E$), and
  computing a motion ($\Delta x$) of the at least one keypoint ($K^j$) in the image along said degree of freedom using said computed comparison (C).

3. Method according to claim 2, characterized in that step d) further comprises updating the position of the at least one gradient patch (dI/dx) associated to the at least one keypoint ($K^j$) using said motion ($\Delta x$) along said degree of freedom.

4. Method according to claim 2, characterized in that the following most recent temporal contrast events ($B^j$) are stored per keypoint $$B^j = \{Ev(x,y,t) : (d((x,y,t), K^j) < \theta) \cap (|B|=N) \cap (\nabla t > \hat{V} \hat{t} \in \widehat{B^j})\},$$

$$\widehat{B^j} = \{(Ev(\hat{x},\hat{y},\hat{t}) : d(\hat{x},\hat{y},\hat{t}), K^j) < \theta) \cap (Ev(\hat{x},\hat{y},\hat{t}) \notin B^j)\}$$

5. Method according to claim 1, characterized in that said image is also sampled with said optical sensor (14), so that the temporal contrast events (Ev) are aligned with said image.

6. Method according to claim 1, characterized in that said image is sampled by a further optical sensor (13) that is aligned with the optical sensor (14).

7. Method according to claim 2, characterized in that the temporal contrast patch ($S_E$) is computed according to $$S_E^j(x,y) = \sum_{P^j(x,y)} w(Ev) \cdot \frac{|\{(x,y) : \exists Ev(x,y,t) \in B^j\}|}{\sum_{\{(x,y) : \exists Ev(x,y,t) \in B^j\}} S_E^j}$$

wherein $$P^j(x,y) = \{Ev(x',y',t) : Ev \in B^j \cap x = x' \cap y = y'\}.$$

8. Method according to claim 2, characterized in that said motion ($\Delta x$) is computed according to $$\Delta x = \underset{x}{\mathrm{argmax}}\left(\left(\frac{dI}{dx}\right) * S_E\right)(x),$$

wherein * denotes the cross-correlation between the at least one gradient patch (dI/dx) and the temporal contrast patch ($S_E$).

9. Method according to claim 1, characterized in that a plurality of gradient patches (dI/dx, dI/dy, dI/dz, dI/dα, dI/dβ, dI/dγ) corresponding to several degrees of freedom of the image patch are computed, wherein the respective gradient patch assigns to each image pixel of the image patch (I) a gradient of the pixel values of the image patch (I) at the respective image pixel along the respective degree of freedom.

10. Method according to claim 2, characterized in that said comparison (C) is a cross correlation, particularly a zero-mean cross correlation.

11. Method according to claim 2, characterized in that said comparison (C) and the position of the at least one keypoint are updated on the acquisition of a single or fixed number of temporal contrast events (Ev).

12. A non-transitory computer readable medium configure to track a position of at least one keypoint in an image of an object moving relative to an optical sensor, wherein the computer program comprises program code for conducting the following steps when the computer program is executed on a computer:
   a) detecting a position of at least one keypoint ($K^j$) in said image, particularly assigning a descriptor vector to the at least one keypoint ($K^j$), generating an image patch (I), wherein the image patch (I) assigns to a pre-defined number of image pixels arranged around the at least one keypoint ($K^j$) the pixel value of the respective image pixel of the image patch (I), and computing at least one gradient patch (dI/dx) along a degree of freedom (x) of the image patch (I), wherein said at least one gradient patch (dI/dx) assigns to each image pixel of the image patch (I) a gradient of the pixel values of the image patch (I) at the respective image pixel along said degree of freedom, and
   b) updating the position of the at least one keypoint ($K^j$) using temporal contrast events (Ev) output by an optical sensor (14) merely when a signal of the optical sensor (14) related to a photocurrent due to the light impinging on a sensor pixel of the optical sensor (14) increases by an amount being larger than a first threshold ($\Theta_{ON}$) or decreases by an amount being larger than a second threshold ($\Theta_{OFF}$) since the last temporal contrast event (Ev) from the respective sensor pixel, wherein each temporal contrast event (Ev(u,v,t)) carries the coordinates (u,v) of its associated sensor pixel, a time (t) at which the respective temporal contrast event (Ev) occurred, as well as a polarity value indicating whether the respective temporal contrast event (Ev) is an ON event at which said signal increased by an amount larger than said first threshold ($\Theta_{ON}$), or an OFF event at which said signal decreased by an amount larger than said second threshold ($\Theta_{OFF}$), and
   c) particularly repeating step b) until a new image is provided in which case steps a) to c) are performed.

13. Device for tracking a position of at least one keypoint in an image of an object moving relative to an optical sensor means, comprising
   an optical sensor means (14, 13) that is designed to detect light reflected from an object (12) and to generate an image of the object (12) comprising image pixels,
   wherein the device is designed to detect a position of at least one keypoint ($K^j$) in said image, and
   wherein said optical sensor means (14, 13) is further designed to detect light reflected by the object (12) by means of a plurality of sensor pixels, wherein each sensor pixel is designed to generate a photocurrent being proportional to the intensity of the light impinging on the respective sensor pixel, and to generate a signal related to said photocurrent, and wherein each sensor pixel is designed to output a temporal contrast event (Ev) merely when the respective signal due to the light impinging on the respective sensor pixel increases by an amount being larger than a first threshold ($\Theta_{ON}$) or decreases by an amount being larger than a second threshold ($\Theta_{OFF}$) since the last temporal contrast event (Ev) from the respective sensor pixel, wherein each temporal contrast event (Ev(u,v,t)) carries the coordinates (u,v) of its associated sensor pixel, a time (t) at which the respective temporal contrast event (Ev) occurred, as well as a polarity value indicating whether the respective temporal contrast event (Ev) is an ON event at which said signal increased by an amount larger than said first threshold ($\Theta_{ON}$), or an OFF event at which said signal decreased by an amount larger than said second threshold ($\Theta_{OFF}$), and wherein
   the device is designed to update the position of the at least one keypoint ($K^j$) using said temporal contrast events, and wherein the device is designed to assign a descriptor vector or an identifier to the at least one keypoint ($K^j$), and wherein the device is designed to generate an image patch that assigns to a pre-defined number of image pixels arranged around the at least one keypoint the pixel value of the respective image pixel of the image patch, and wherein the device is designed to compute at least one gradient patch along a degree of freedom of the image patch, wherein said at least one gradient patch assigns to each image pixel of the image patch a gradient of the pixel values of the image patch at the respective image pixel along said degree of freedom.

14. Device according to claim 13, characterized in that the optical sensor means is formed as a single optical sensor (14) that is designed to sample said image as well as to generate said temporal contrast events (Ev) so that the temporal contrast events (Ev) are aligned with said image, or in that the sensor means comprises an optical sensor (14) designed to generate said temporal contrast events (Ev) as well as a separate further optical sensor (13) designed to sample said image, which further optical sensor (13) is aligned with the optical sensor (14), so that the temporal contrast events (Ev) are aligned with said image.

* * * * *